Sept. 12, 1944.  W. L. MULCRONE  2,357,904
METHOD AND APPARATUS FOR INSTALLING THERMOPLASTIC CRYSTALS
Filed Jan. 5, 1943  5 Sheets-Sheet 4
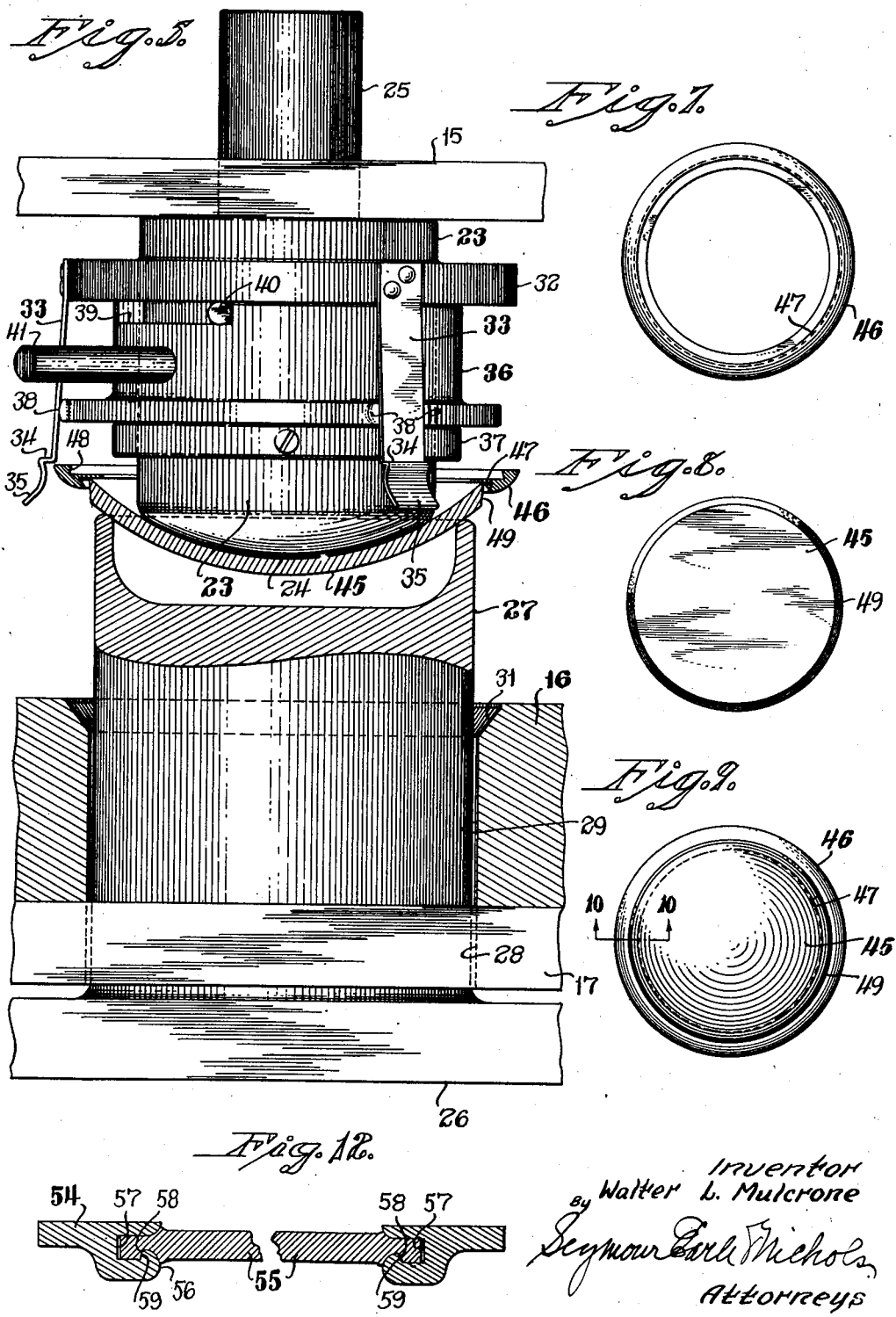
Inventor
Walter L. Mulcrone
by Seymour Earl Nichols
Attorneys

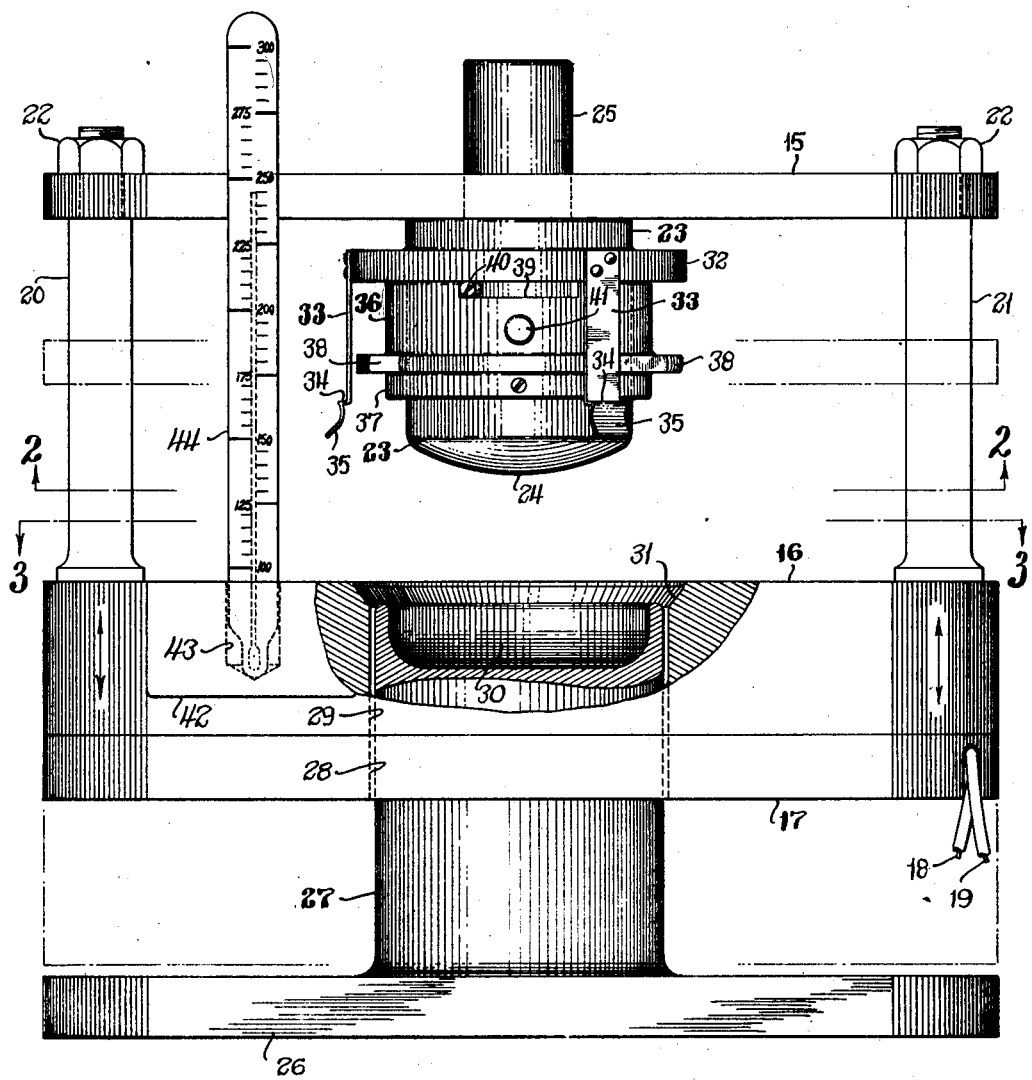

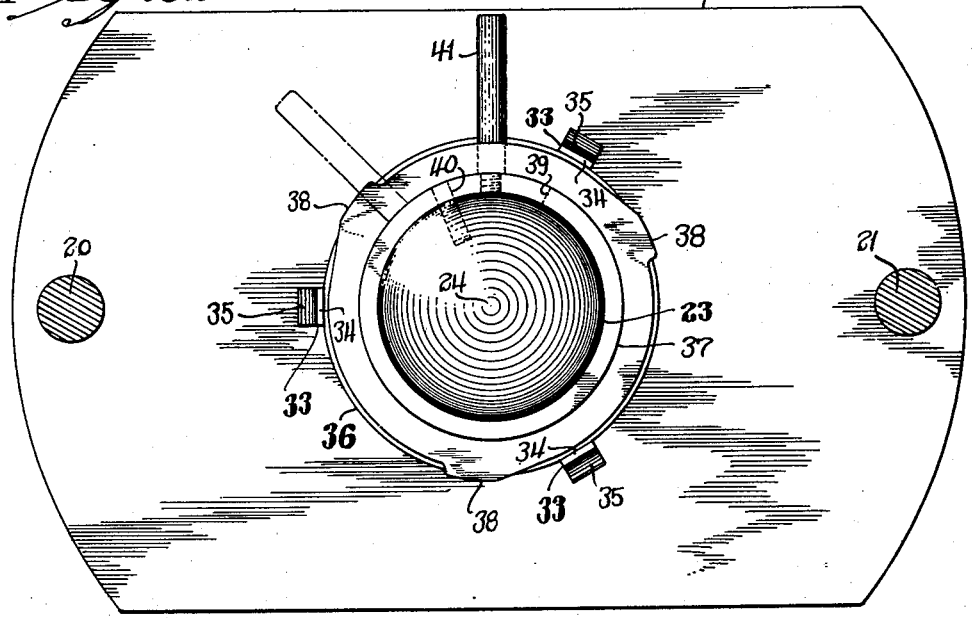
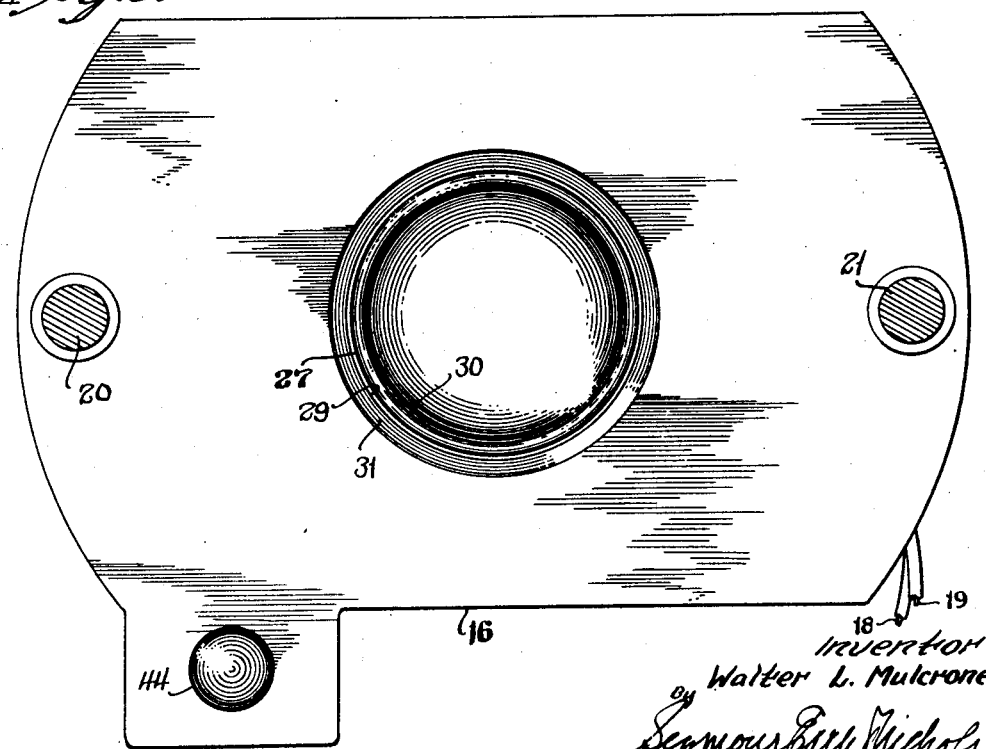

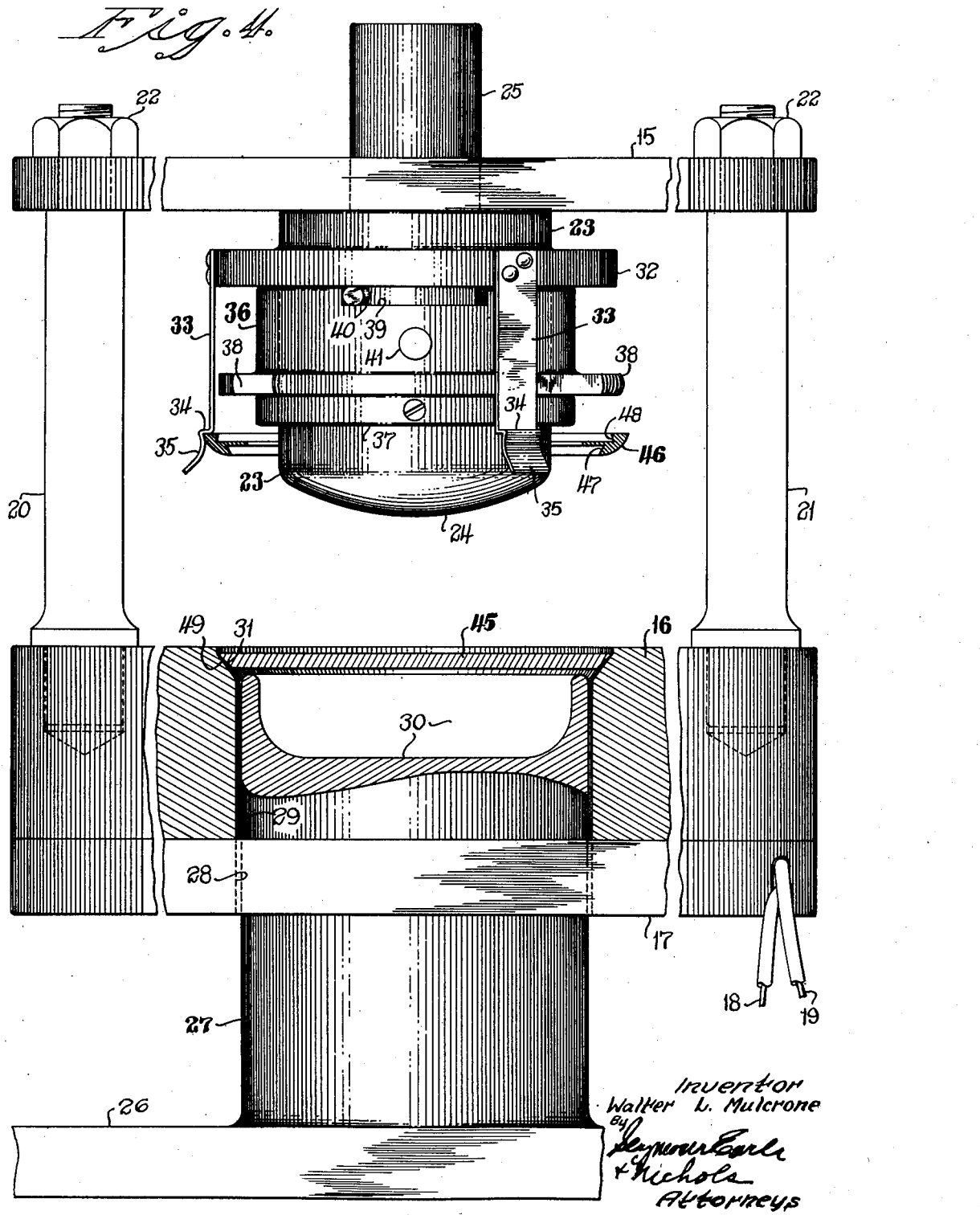

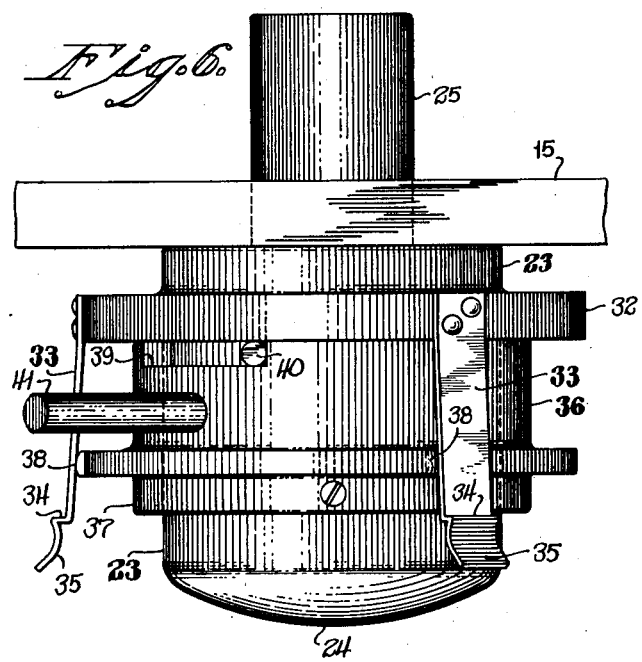
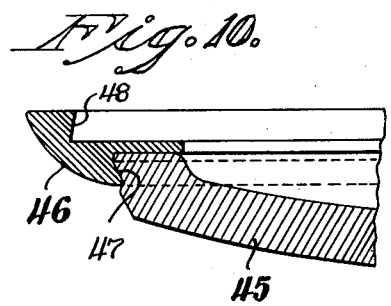
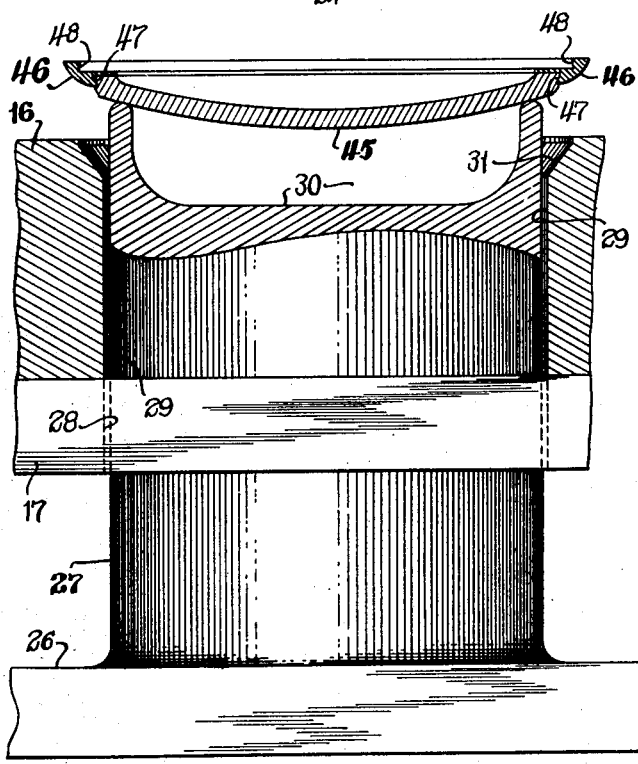
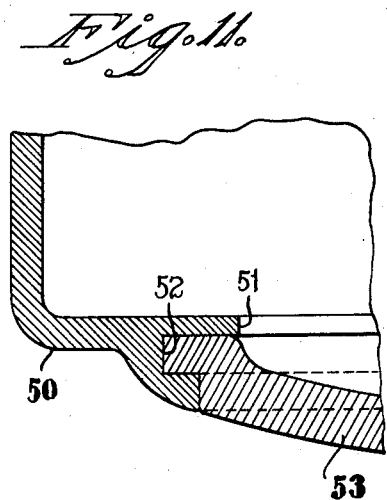

Patented Sept. 12, 1944

2,357,904

UNITED STATES PATENT OFFICE 2,357,904

METHOD AND APPARATUS FOR INSTALLING THERMOPLASTIC CRYSTALS

Walter L. Mulcrone, Waterbury, Conn.

Application January 5, 1943, Serial No. 471,375

9 Claims. (Cl. 18—5)

The present invention relates to improvements in methods and apparatus whereby transparent or translucent crystals may be installed in the bezels of watches, clocks, compasses, and other instruments or devices where it is desired to provide closures or crystals of thermoplastic material for apertures or sight-openings therein.

It may here be explained that it has heretofore been proposed to install flexible crystals in bezels by flexing or springing such crystals into concavo-convex form to, in effect, contract the diameter or other lateral dimensions of the crystal to permit its ready insertion into a suitable groove or seat in a bezel. Such mode of procedure has not, however, insured a sufficiently-tight engagement or union between the edge of the crystal and the groove or seat in the bezel when the concavo-convexing force was relaxed to permit the crystal to expand its diameter or other lateral dimension.

As will be apparent from the following, the present invention contemplates utilizing substantially the procedure just above outlined, in conjunction, however, with a unique procedure whereby a satisfactory seal is provided between the engaging portions of the bezel and crystal. The unique procedure may be briefly characterized as one which will render plastic and non-springing only the rim-portion of the crystal while maintaining the body-portion thereof in such condition as to preserve its springiness or elasticity. This localized differentiation created between different portions of the crystal achieves highly-advantageous results of a character as will hereinafter appear.

One of the objects of the present invention is to provide a superior method and apparatus whereby crystals or closures may be installed in the apertures of instruments or other devices in such manner as will assure the retention of such crystals over long periods of time despite marked changes in temperature.

Another object of the present invention is to provide a superior method and apparatus whereby crystals of thermoplastic material may be mounted in such manner that the junction between a given crystal and the structure in which it is mounted is of such character as to effectively exclude moisture, dust and other foreign matter from entry into the instrument or device.

A further object of the present invention is to provide a superior method for installing crystals of thermoplastic material whereby inequalities in either or both of the engaging surfaces of a crystal and its mount, may be compensated for and a tight joint assured.

Still another object of the present invention is to provide a superior method and apparatus whereby a crystal of thermoplastic material may have its edge-portion flowed into tight engagement with the structure in which the said crystal is mounted without depriving the main portion of such crystal of sufficient tension to maintain the crystal in firm engagement with its supporting structure.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a view mainly in side elevation and partly in vertical-central section of an apparatus for installing crystals in accordance with the present invention, with the male flexing-member being shown fully retired in readiness to receive both a crystal and a bezel;

Fig. 2 is a transverse sectional view taken on the line 2—2 of Fig. 1;

Fig. 3 is a similar view but taken on the line 3—3 of Fig. 1;

Fig. 4 is a broken view similar to Fig. 1 but with both a bezel and a crystal appropriately positioned in the apparatus preparatory to being assembled;

Fig. 5 is a view similar to Fig. 4 but showing the male flexing-member and associated parts moved downwardly to effect the bowing-up of the crystal and the release of the bezel in position to receive the crystal;

Fig. 6 is a broken view similar to Fig. 5 but showing the male flexing-member and associated parts partly retired to relieve the crystal of flexing stress to thus permit the latter to seat its rim-portion in the groove of the bezel;

Fig. 7 is a face view of the bezel;

Fig. 8 is a similar view of the crystal prior to being bowed;

Fig. 9 is a face view of the unit comprising the bezel and the crystal subsequent to their assembly;

Fig. 10 is a broken detail sectional view taken on the line 10—10 of Fig. 9;

Fig. 11 is a view corresponding to Fig. 10 but showing another form of bezel and crystal assembly in which the crystal is also held in place by substantially-edgewise compression; and Fig. 12 is a broken detail sectional view of still another form of bezel and crystal assembly in which the dust-tight union between the elements is maintained by substantially-edgewise tension.

The showing of Figs. 1 to 10 inclusive

In Figs. 1 to 6 inclusive of the accompanying drawings is shown one form of apparatus suitable for carrying out the present invention. The said apparatus includes a head-plate 15, a relatively-massive crystal-holding member 16 and a plate-like electric heating-member 17 secured in any suitable manner against the under face of the crystal-holding member 16 and having complemental terminal-leads 18 and 19 for connection to any suitable source of electrical energy.

The crystal-holding member 16 is held in spaced relationship below the head-plate 15 by two (more or less) pillars 20 and 21 threaded at their lower ends into the upper portions of the crystal-holding member and at their upper ends extending through the head-plate 15 and clamped thereto by suitable nuts 22—22 respectively.

Extending downwardly from the central portion of the head-plate 15 and rigid therewith is a male flexing-member 23 which, in the instance shown, is generally of cylindrical form and is provided at its lower end with a convex flexing-face 24. At its upper end, the said flexing-member 23 is formed with a central shank 25 passing upwardly through the central portion of the head-plate 15 and extending upwardly therebeyond into position to be gripped in the ram or the like of a press or other suitable machine. Preferably, the fit of the shank 25 in the central portion of the head-plate 15 is a drive fit so as to rigidly couple the flexing-member 23 to the head-plate 15.

Below the crystal-holding member 16 and its heating-member 17 is a base-plate 26 adapted to rest upon the surface of a suitable machine and provided centrally with an upstanding female flexing-member 27 which, in the particular instance shown, is of cylindrical form exteriorly and is suited, like the male flexing-member 23, for use in conjunction with a circular crystal. The female flexing-member 27 is located in axial alignment with the male flexing-member 23 and projects upwardly into a central clearance-passage 28 in the heating-member 17 and into an aligned clearance-passage 29 in the crystal-holding member 16. In its upper end, the flexing-member 27 is formed with a cavity 30 into which the central portion of a crystal is adapted to be flexed by the lower end of the flexing-member 23. Surrounding the upper end of the clearance-passage 29 in the crystal-holding member 16 is a conically-contoured heating-seat 31 flaring outwardly and upwardly as shown.

A short distance below the head-plate 15, the male flexing member 23 is provided with a rigid annular flange 32 projecting outwardly beyond the main periphery of the said flexing-member. Secured at their upper ends respectively, to the periphery of the flange 32 just referred to, are three (more or less) flexible bezel-holding fingers 33. The said fingers 33 are each preferably formed of spring metal and each thereof is formed adjacent its lower end with an integral substantially-horizontal bend 34 providing a downwardly-facing seat for engagement by a bezel in a manner as will hereinafter appear. Integral with and extending downwardly from the outer end of the bend 34 of each of the fingers 33 is a curved bezel-retaining finger 35, the upper portion of which curves slightly inwardly toward the male flexing-member 23 and thence curves rapidly outwardly away therefrom.

Mounted with capacity for rotation upon the periphery of the male flexing-member 23 immediately below the annular flange 32 thereof, is a releasing-ring 36 supported by a collar 37 removably secured to the flexing-member 23 immediately below the releasing-ring 36. Adjacent its lower end, the releasing-ring 36 is formed upon its periphery with three cam-lugs 38 (Fig. 2) respectively coacting with the respective inner face of the bezel-holding fingers 33 adjacent the lower ends of the latter. To limit the turning movement of the releasing-ring 36 with respect to the flexing-member 23, the said releasing-ring is formed in its upper edge with an arcuate notch 39 into which projects a stop-pin 40 mounted in the flexing-member 23. The engagement of the respective opposite end-walls of the notch 39 with the respective opposite sides of the stop-pin 40 serves to limit the oscillating movement of the releasing-ring 36 with respect to the male flexing-member 23. To enable the said ring to be oscillated conveniently for purposes as will hereinafter appear, a handle 41 is rigidly attached at its inner end to and radially projects from the said releasing-ring.

For purposes of visually checking the temperature of the crystal-holding member 16, a thermometer-supporting lug 42 is formed on the edge of the crystal-holding member 16, as is shown in Figs. 1 and 3. The said lug 42 is formed with an upwardly-opening socket 43 into which is secured by any suitable heat-conducting cement a thermometer 44.

The particular apparatus shown is adapted to effect the installation of disk-like crystals such as 45 into a suitable bezel such, for instance, as 46. The particular bezel 46 shown in Figs. 4, 5, 6, 7, 9 and 10 is of ring-like form and is provided in its forward face with an annular undercut crystal-receiving groove 47, while in its back face the said crystal is formed with an annular groove 48 by means of which latter the bezel may be snapped over a conventional seat formed on a watch or other instrument. The bezel 46 may be made of any suitable material such, for instance, as metal or Bakelite and may assume a wide variety of forms to meet the exigencies of any given situation.

The crystal 45, whatever its shape, is to be formed of flexible and resilient thermoplastic material, i. e., material which is flexible and springy at room temperature but which may be renedered plastic by the application of heat thereto. Suitable thermoplastic materials of the nature referred to are even at the present date very numerous and for purposes of brevity, the crystal 45 may be considered as being formed of an acrylate resin such, for instance, as those marketed under the trade names of "Lucite" and "Plexiglas" and having a softening point of about 150° F. Cast phenolic resins may be especially mentioned as suitable for use in carrying out the present invention.

To prepare the apparatus for the installation of a crystal of acrylate resin having the characteristics just above described and of about .12" thick, the crystal-holding member 16 should preferably be heated to a temperature of from about 240° F. to about 250° F., so that its conically-contoured heating-seat 31 will assume substantially that temperature. The heating of the crystal-holding member 16 or its equivalent may be effected in any suitable manner such, for instance, as by a gas flame, though it is preferred, as is shown in the accompanying drawings, to provide electrical heating means such, for instance, as the plate-like electric heating-member 17. The application of current to the terminal-leads 18 and 19 of the heating-member 17 will serve to heat the crystal-holding member 16 to the desired temperature. Such temperature may be checked by means of the thermometer 44.

When the crystal-holding member 16 has reached the desired temperature and while the parts are in the positions indicated in Figs. 1, 2 and 3, the crystal 45 is placed in the heating-seat 31 of the member 16 so that the beveled edge 49 of the said crystal slopes in the same direction as the slope of the conically-contoured heating-seat. It is preferred that the heating-seat 31 have a slightly-different angle from that of the beveled edge 49 of the crystal, so that mainly the larger diameter of the rim-portion of the crystal will rest against the seat and thus mainly localize the desired plasticizing action thereto.

Either before or after the installation of the crystal 45 or its equivalent in the crystal-holding member 16, a suitable bezel such as 46 is slipped upwardly over the lower end of the male flexing-member 23 and into engagement with the under surfaces of the respective bends 34 of the flexible bezel-holding fingers 33. The positioning of the bezel 46 as just described will first cause the fingers 33 to yield outwardly, following which they will spring inwardly and grip the periphery of the bezel. The parts may be assumed to be in the position in which they are shown in Fig. 4, in which position it will be noted that the releasing-ring 36 is in position to permit the bezel-holding fingers 33 to grip the bezel 46.

Under the temperature conditions above described, and with the particular thermoplastic material being used, it is preferred that the crystal 45 remain in the crystal-holding member 16 for a period of about 25 to 35 seconds, which time-period will serve to render plastic the rim-portion of the crystal, while the body-portion of the crystal remains at a temperature below that required to deprive it of its inherent springiness or elasticity.

Following the expiration of the period just above referred to, the unit comprising the head-plate 15, crystal-holding member 16, heating-member 17, male flexing-member 23 and associated parts may be moved downwardly into the positions in which they are shown in Fig. 5, though the releasing-ring 36 will be kept in the position in which it is shown in Fig. 4.

In the course of the parts moving downwardly into the positions shown in Fig. 5, the crystal-holding member 16 will move downwardly away from the crystal 45 at the same time that the male flexing-member 23 approaches and engages with the upper surface of the said crystal. The downward motion of the male flexing-member 23 will continue until the convexed lower face 24 thereof has acted in conjunction with the upper edge of the female flexing-member 27 around the cavity 30 therein, to bow or spring the crystal 45 with its now-plastic edge-portion to a degree beyond that intended for it to assume when finally in place in the bezel 46. As the male flexing-member 23 and associated parts descend, the bezel 46 will arrive in proper position (Fig. 5) at substantially the same time that the crystal 45 has been flexed to its desired maximum. The releasing-ring 36 is now preferably swung into the position shown in Fig. 5 by means of its handle 41, to thereby cause the cam-lugs 38 of the said releasing-ring to outwardly flex the lower end of the bezel-holding fingers 33 into the positions in which they are shown in Fig. 5 to thereby fully release the bezel 46 which will now rest upon the now-plastic rim-portion of the crystal 45 free of other restraint.

Promptly following the completion of the movement of the parts into the positions in which they are shown in Fig. 5, the unit comprising the heat-plate 15 and the parts carried thereby should be rapidly lifted and brought into a partly-raised position such as is shown in Fig. 6, with the result that the springing force or concavo-convexing force upon the crystal 45 will be released, thereby permitting the said crystal, in effect, to expand its diameter as it partially flattens out. This action will cause the inherent springiness or elasticity of the body-portion of the crystal 45 to press the now-plastic rim-portion of the crystal firmly against the surfaces of the groove 47 in the bezel 46. This action will result in a localized flowing of the now-plastic rim-portion of the crystal 45 so that irregularities in both the groove 47 of the bezel 46 and irregularities in the rim-portion of the crystal 45 will be compensated for and a fluid-tight and dust-tight union will be effected between the parts 45 and 46. Due to the fact that only the rim-portion of the crystal 45 has been rendered plastic while the body-portion thereof has been maintained at a temperature below that required to deprive it of its springiness or elasticity, the inherent tension remaining in the body-portion of the crystal will serve over a long period of time to maintain the engagement between the rim-portion of the crystal and the surfaces of the groove 47 in the bezel.

Following the movement of the male flexing-member 23 and the parts associated therewith into the semi-retired positions in which they are shown in Fig. 6, the now-assembled crystal and bezel should be removed from the apparatus and the movement would normally be rapidly continued until the said flexing-member 23 and associated parts have reached their uppermost positions, as shown in Fig. 4. The releasing-ring 36 may now be turned to restore it to the position in which it is shown in Fig. 4, whereupon the apparatus is again ready to receive a fresh bezel and a fresh crystal, preparatory to their assembly in a manner similar to that above described in connection with the crystal 45 and bezel 46.

The showing of Fig. 11

In Fig. 11 is shown a bezel-unit 50 which may be conveniently formed of Bakelite or other suitable material and which, instead of being merely of ring-like form, constitutes in effect a case-member, in the forward face of which is formed a usual sight-aperture 51. Around the said sight-aperture is formed a crystal-receiving groove 52 in which the walls extend at substantially a right angle with respect to each other, rather than at an acute angle as in the bezel 46. Installed in the crystal-receiving groove 52 of the bezel-unit 50 as shown, is a crystal 53 of any suitable thermoplastic material.

The crystal 53 may be installed in the bezel-unit 50 so as to be assembled therewith in the manner shown in Fig. 11, by means of any suitable apparatus such, for instance, as one generally corresponding to the apparatus previously described in connection with the crystal 45 and bezel 46. In effecting the installation of the crystal 53 in the bezel-unit 50, the rim-portion of the said crystal will be rendered plastic, while the central portion or body-portion of the crystal is maintained at a temperature below that required to deprive it of its springiness. After having been concavo-convexed and released from tension, its plastic edge or rim-portion will be forced by the inherent springiness or tension of the body-portion of the crystal into fluid-tight and dust-tight union with the surfaces of the crystal-receiving groove 52 in the bezel, in a manner fundamentally corresponding to that described in connection with the crystal 45 and bezel 46.

*The showing of Fig. 12*

Following the installation of the crystals 45 and 53 in their respective bezels or case-members as before described, each of the said crystals maintains its previously-plastic rim-portion in sealing engagement with the contacting portion of its complemental bezel by a substantially-edgewise thrust. In the structure of Fig. 12, as will presently be described, a crystal is maintained in sealing engagement with its complemental bezel or case by substantially-edgewise tension or pull.

In Fig. 12 is shown a case-member or bezel 54 which is employed in conjunction with a crystal 55 of thermoplastic material. The case-member 54 is formed with a sight-opening or aperture 56 which the crystal 55 serves to close and which is surrounded by an annular inwardly-opening groove 57. The said groove 57 has formed therein an outwardly-facing annular sealing-abutment 58 which is engaged by an annular but inwardly-facing sealing-abutment 59 formed in the rim-portion of the crystal 55.

In assembling the case-member 54 and the crystal 55, the rim-portion of the said crystal is subjected to heat to a degree required to render the said rim-portion plastic, while the body-portion of the crystal, however, is maintained at a sufficiently-low temperature to preserve its elasticity or tension, though the said body-portion is preferably permitted to rise in temperature above room temperature and closely approaching the heat-softening point of the material. The crystal 55, preferably after having its rim-portion rendered plastic, is bowed into concavo-convex form by any suitable apparatus or device, and thereby reduced sufficiently in diameter to permit its rim-portion to fit within the sight-opening 56 in alignment with the open inner terminus of the groove 57. Now, when the crystal 55 or its equivalent is released from bowing stresses, while its rim-portion is still plastic, the said rim-portion will be forced into the groove 57 over and around the sealing-abutment 58 therein into substantially the position in which it is shown in Fig. 12. In instances where the entry into a groove such as 57 is markedly constricted, the body-portion of the crystal 55, after having been bowed up into concavo-convex form, may be forcibly flattened by external means to expedite the entry of its plastic rim-portion into the said groove.

After the crystal 55 has been installed and permitted to cool down to normal temperature, the crystal as a whole will shrink and firmly seat its inwardly-facing sealing-abutment 59 against the complemental but outwardly-facing sealing-abutment 58 of the case-member 54 to thus provide a tight connection between the two said elements 54 and 55.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A method for installing thermoplastic crystals in bezels, comprising: providing a bezel having a crystal-receiving groove therein and also providing a complemental plate-like crystal of inherently-springy thermoplastic material; heating the rim-portion of the said plate-like crystal to its softening point to render the same plastic while maintaining the body-portion of the said crystal at a temperature below that required to deprive it of its inherent springiness, the said heating being effected prior to the following described engagement between the said crystal and the said bezel; springing the said plate-like crystal into concavo-convex form; juxtaposing the previously heated and softened rim-portion of the said crystal and the crystal-receiving groove of the said bezel while the said crystal is held in concavo-convex form and relaxing the springing force upon the said crystal to permit the inherent springiness of the body-portion thereof to press and deform the plastic rim-portion of the crystal into sealing engagement with the surfaces of the crystal-receiving groove in the said bezel.

2. A method for installing thermoplastic crystals in bezels, comprising: providing a bezel having a crystal-receiving groove therein and also providing a complemental plate-like crystal of inherently-springy thermoplastic material; heating the rim-portion of the said plate-like crystal prior to the following concavo-convexing step and prior to the following described engagement between the said crystal and the said bezel, to thereby soften the rim-portion of the said crystal to a point rendering the same plastic while at the same time maintaining the body-portion of the said crystal at a temperature below that required to deprive it of its inherent springiness; springing the said plate-like crystal into concavo-convex form; juxtaposing the previously heated and softened rim-portion of the said crystal and the crystal-receiving groove of the said bezel while the said crystal is held in concavo-convex form; and relaxing the springing force upon the said crystal to permit the inherent springiness of the body-portion thereof to press and deform the plastic rim-portion of the crystal into sealing engagement with the surfaces of the crystal-receiving groove in the said bezel.

3. A method for installing thermoplastic crystals in bezels, comprising: providing a bezel having an undercut crystal-receiving groove therein and also providing a complemental plate-like crystal of inherently-springy thermoplastic material and having a beveled rim-portion; heating the beveled rim-portion of the said plate-like crystal to its softening point to render the same plastic while maintaining the body-portion of the said crystal at a temperature below that required to deprive it of its inherent springiness, the said heating being effected prior to the following described engagement between the said crystal and the said bezel; springing the said plate-like crystal into concavo convex form; juxtaposing the previously heated and softened beveled rim-portion of the said crystal and the undercut crystal-receiving groove of the said bezel while the said crystal is held in concavo-convex form; and relaxing the springing force upon the said crystal to permit the inherent springiness of the body-portion thereof to press and deform the beveled plastic rim-portion of the crystal into sealing engagement with the surfaces of the undercut crystal-receiving groove in the said bezel.

4. A method for installing thermoplastic crystals in bezels, comprising: providing a bezel having an undercut crystal-receiving groove therein and also providing a complemental plate-like crystal of inherently-springy thermoplastic material and having a beveled rim-portion; heating the beveled rim-portion of the said plate-like crystal prior to the following concavo-convexing step and prior to the following described engagement between the said crystal and the said bezel, to render the rim-portion of the crystal plastic while maintaining the body-portion of the said crystal at a temperature below that required to deprive it of its inherent springiness; springing the said plate-like crystal into concavo-convex form; juxtaposing the previously heated and softened beveled rim-portion of the said crystal and the undercut crystal-receiving groove of the said bezel while the said crystal is held in concavo-convex form; and relaxing the springing force upon the said crystal to permit the inherent springiness of the body-portion thereof to press and deform the beveled plastic rim-portion of the crystal into sealing engagement with the surfaces of the undercut crystal-receiving groove in the said bezel.

5. A method for installing thermoplastic crystals in bezels, comprising: providing a bezel having a crystal-receiving groove therein and also providing a complemental plate-like crystal of inherently-springy thermoplastic material; providing a crystal-holding member which is independent of the said bezel and having a rim-heating seat and heating the said rim-heating seat to a temperature sufficient to render plastic the rim-portion of the said crystal; placing the said crystal in the said crystal-holding member in position to engage the rim-portion of said crystal with the rim-heating seat in the said crystal-holding member to heat the said rim-portion to its softening point; maintaining the body-portion of the said crystal at a temperature below that required to deprive it of its inherent springiness while the rim-portion of the crystal is plastic; springing the said plate-like crystal into concavo-convex form to disengage its rim-portion from the rim-heating seat of the said crystal-holding member; juxtaposing the previously heated and softened rim-portion of the said crystal and the crystal-receiving groove of the said bezel while the said crystal is in concavo-convex form; and relaxing the springing force upon the said crystal to permit the inherent springiness of the body-portion thereof to press and deform the plastic rim-portion of the crystal into sealing engagement with the surfaces of the crystal-receiving groove in the said bezel.

6. A method for installing thermoplastic crystals in bezels, comprising: providing a bezel having an undercut crystal-receiving groove therein and also providing a complemental plate-like crystal of inherently-springy thermoplastic material and having a beveled rim-portion; providing a crystal-holding member which is independent of the said bezel and having a rim-heating seat and heating the said rim-heating seat to a temperature sufficient to render plastic the beveled rim-portion of the said crystal; placing the said crystal in the said crystal-holding member in position to engage the beveled rim-portion of said crystal with the rim-heating seat in the said crystal-holding member to heat the said beveled rim-portion to its softening point; maintaining the body-portion of the said crystal at a temperature below that required to deprive it of its inherent springiness while the beveled rim-portion of the crystal is plastic; springing the said plate-like crystal into concavo-convex form to disengage its beveled rim-portion from the rim-heating seat of the said crystal-holding member; juxtaposing the previously heated and softened beveled rim-portion of the said crystal and the undercut crystal-receiving groove of the said bezel while the said crystal is in concavo-convex form; and relaxing the springing force upon the said crystal to permit the inherent springiness of the body-portion thereof to press and deform the plastic beveled rim-portion of the crystal into sealing engagement with the surfaces of the undercut crystal-receiving groove in the said bezel.

7. A method for installing thermoplastic crystals in bezels, comprising: providing a bezel having a crystal-receiving groove therein and also providing a complemental plate-like crystal of inherently-springy thermoplastic material; providing a crystal-holding member which is independent of the said bezel and having a rim-heating seat and heating the said rim-heating seat to a temperature sufficient to render plastic the rim-portion of the said crystal; placing the said crystal in the said crystal-holding member in position to engage the rim-portion of said crystal with the rim-heating seat in the said crystal-holding member to heat the said rim-portion to its softening point; maintaining the body-portion of the said crystal at a temperature below that required to deprive it of its inherent springiness while the rim-portion of the crystal is plastic; springing the said plate-like crystal into concavo-convex form to disengage its rim-portion from the rim-heating seat of the said crystal-holding member; juxtaposing the previously heated and softened rim-portion of the said crystal and the crystal-receiving groove of the said bezel while the said crystal is in concavo-convex form and at the same time retiring the said crystal-holding member away from the said crystal; and relaxing the springing force upon the said crystal to permit the inherent springiness of the body-portion thereof to press and deform the plastic rim-portion of the crystal into sealing engagement with the surfaces of the crystal-receiving groove in the said bezel.

8. An apparatus for installing thermoplastic crystals in bezels, comprising: a crystal-holding member having a clearance-passage therethrough and having a rim-heating seat adjacent one end of the said clearance-passage in position to receive and heat the rim-portion of a thermoplastic crystal; a female crystal-flexing member extending into the clearance-passage in the said crystal-holding member; one of the pair of members, comprising the said crystal-holding member and the said female crystal-flexing member, having relative movement in an axial direction with respect to the other to cause the said female crystal-flexing member to be in a position in advance of the rim-heating seat of the said crystal-holding member; a male crystal-flexing member normally spaced in an axial direction away from the said female crystal-flexing member and the rim-heating seat of the said crystal-holding member; one of the said crystal-flexing members being movable axially toward the other to grip a plate-like crystal therebetween and to spring the said crystal into concavo-convex form; and shifting-means constructed and arranged to automatically disengage the said crystal and the rim-heating seat of the said crystal-holding member when one of the said crystal-flexing members is moved toward the other thereof to effect the aforesaid springing of the crystal into concavo-convex form.

9. An apparatus for installing thermoplastic crystals in bezels, comprising: a crystal-holding member having a clearance-passage therethrough and having a rim-heating seat adjacent one end of the said clearance-passage in position to receive and heat the rim-portion of a thermoplastic crystal; a female crystal-flexing member extending into the clearance-passage in the said crystal-holding member; the said crystal-holding member having relative movement in an axial direction with respect to the said female crystal-flexing member to retire the heating seat of the said crystal-holding member with respect to the said female crystal-flexing member; a male crystal-flexing member normally spaced in an axial direction away from the said female crystal-flexing member and the rim-heating seat of the said crystal-holding member; the said male crystal-flexing member being movable axially toward the said female crystal-flexing member to grip a plate-like crystal therebetween and to spring the said crystal into concavo-convex form; and coupling-means connecting the said crystal-holding member to the said male crystal-flexing member to cause the rim-heating seat of the said crystal-holding member to move away from the crystal when one of the said male crystal-flexing members is moved toward the said female crystal-flexing member.

WALTER L. MULCRONE.